J. B. OWENS.
SANITARY INCINERATOR.
APPLICATION FILED JAN. 16, 1917.
1,303,584.
Patented May 13, 1919.
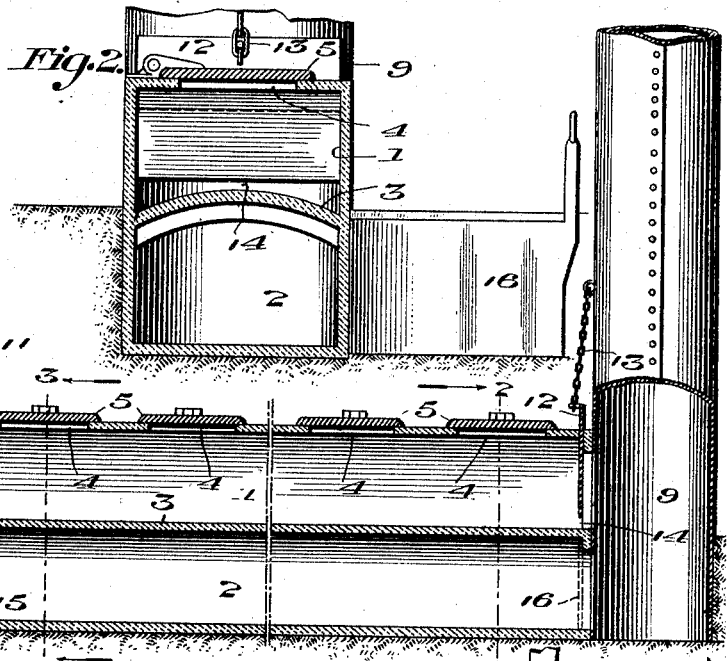
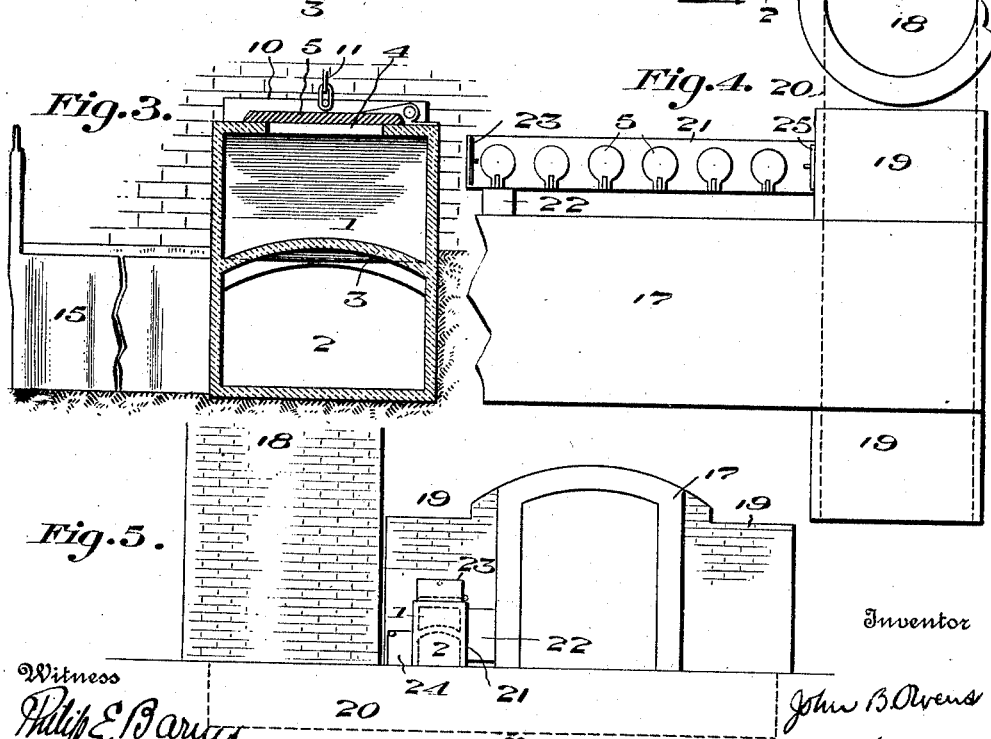

UNITED STATES PATENT OFFICE.

JOHN B. OWENS, OF METUCHEN, NEW JERSEY.

SANITARY INCINERATOR.

1,303,584.  Specification of Letters Patent.  Patented May 13, 1919.

Application filed January 16, 1917. Serial No. 142,674.

*To all whom it may concern:*

Be it known that I, JOHN B. OWENS, a citizen of the United States, residing at Metuchen, county of Middlesex, and State of New Jersey, have invented certain new and useful Improvements in Sanitary Incinerators, of which the following is a specification.

This invention relates to sanitary incinerators, and more particularly to an incinerator for use in connection with waste heat systems.

Sanitary arrangements at factories, institutions, or other places where a large number of persons have to be accommodated, constitute an important item in the cost of construction of a plant of any character. Sewage disposal systems, cesspools, septic tanks, and the like are limited in their application and depend to a certain extent on local conditions. Sewer connections are not available in some places and in others the cost of such a connection is prohibitive. Aside from these considerations, incineration provides the most effective sanitation and, as proposed by my present invention, the utilization of waste heat in effecting incineration provides the most economical, as well as the most sanitary system. The matter to be disposed of is entirely organic and only requires drying before it will burn freely.

While the present incinerator is adapted to utilize waste heat such as may be derived from a kiln, steam boiler furnace or the like, or even from a house furnace, or cooking stove, the apparatus is not thus restricted as heating means such as oil or gas burners, coal or wood furnaces may be used for the production of direct heat to dry the material preparatory to incineration.

My invention contemplates the provision of means for preliminary drying of the material in a chamber or the like, and, subsequently, igniting the dried material and burning it to a fine ash. The preliminary drying is accomplished by heat radiated into the material-receiving chamber. Subsequently the dried material is subjected to heat directly admitted into the material-receiving chamber. When waste heat is employed, if the temperature of the gas admitted to the material-receiving chamber is not sufficiently high to ignite the dried material, ignition may be started by dropping a piece of burning oil-waste, or any inflammable material, previously ignited, into the material-receiving chamber and admitting enough air to support combustion. Where the application of heat, for purposes of incineration directly admitted into the material-receiving chamber is sufficient to accomplish that end, this supplemental ignition need not be resorted to. If the drying of the material by radiation through a wall of the material-receiving chamber has not been thoroughly effected, the subsequent introduction of heat directly into the material-receiving chamber will rapidly complete such drying and incineration may then be effected.

Draft means provides for the taking off of the incinerated material as well as providing for the proper circulation of heat.

The apparatus may comprise, by way of example, a material-receiving chamber or flue, and a heating chamber or flue adjacent thereto from which heat is radiated through a wall, partition, or arch into the material-receiving chamber to effect drying of the material therein. The respective flues are, at one point, subject to waste heat, under suitable valve or damper control, and at another point they connect with a stack or are subject to draft producing means, subject to valve or damper control.

If waste heat is not utilized, other sources of heat may be employed.

While I have disclosed the invention in the drawings and following description in connection with waste heat supplied from a boiler, and a kiln, respectively, the invention is not thus limited.

In the accompanying drawings:

Figure 1 is a vertical section showing the incinerator in connection with a steam boiler and a stack;

Fig. 2 a section on the line 2—2 Fig. 1;

Fig. 3 a section on line 3—3 Fig. 1;

Fig. 4 a plan view showing the application of the incinerator to a tunnel kiln and its stack; and Fig. 5 an end elevation viewed from the left of Fig. 4.

Referring first to Figs. 1, 2 and 3, the material-receiving chamber 1 is located adjacent, preferably above, the heating chamber 2 and separated therefrom by a wall or partition, such as an arch 3. The material of which the incinerator is built is immaterial, provided it is adapted to withstand the heat. In the top of the chamber 3 are openings or seats 4 provided with covers 5 for normally closing said seats or openings. The chambers 1 and 2 may be of any desired length and located in any preferred position and need not be disposed close to the source of waste heat as any suitable connections thereto, and to the draft stack, may be employed. In Fig. 1 a steam boiler furnace is shown at 6 which has the waste heat space or flue 7 communicating by an opening 8 with the chambers 1 and 2. The stack appears at 9. The entire volume of waste heat may pass to the stack 9 through the incinerator, or, only a portion of such waste heat may be by-passed for utilization by the invention. Any suitable damper or valve 10 is used to control admission of the waste heat to the chamber 1. A sliding damper which can be held in raised position by a chain or other connection 11, is shown. At the exit end of the chamber 1 there is a damper 12 which may be of any preferred form. The damper shown is suspended by a chain 13 and may be arranged so that there is a normal draft or bleed at 14 below the lower edge thereof to carry off any odors.

The inlet and outlet ends of the chamber 2 are controlled by any suitable valves or dampers, sliding dampers 15 and 16 being shown.

Normally the damper 10 is closed and the damper 12 slightly open to provide the bleed 14 and dampers 15 and 16 are open to allow the waste heat to pass from the flue 7 and opening 8 through the chamber 2 into the stack 9. During the passage of the waste heat the arch or partition 3 is heated and the material in the chamber 1 is dried by the heat radiated through arch 3 into chamber 1. Under normal drying conditions the dampers are as shown in Figs. 1, 2 and 3. The leak or bleed at 14 causes a down draft through the seat openings 4 to carry off odors. The material in chamber 1 having been suitably dried, the dampers 15 and 16 are closed and dampers 10 and 12 opened thereby admitting waste heat directly into the chamber 1. If the drying of the material in chamber 1 has not been thoroughly effected by the radiation of heat from the chamber 2, the admission of waste heat into the chamber 1 will rapidly complete the drying of the material. If the temperature of the gas circulating through the chamber 1 is not high enough to ignite the dried material, ignition may be started by dropping a piece of burning oil waste, or of any inflammable material previously ignited, through one of the seat openings 4 into the chamber 1. If combustion is to be accelerated, a small amount of oil or other inflammable material may be introduced into the chamber 1, but this would not ordinarily be necessary.

The incineration of the dried material in chamber 1, as described, need only occur at intervals. At all other times the dampers are in the position shown in Figs. 1, 2 and 3.

In Figs. 4 and 5 I have shown the incinerator and method of its operation applied to a tunnel kiln 17 which is provided with a stack or chimney 18 and with outlets 19 connected to the stack by flue 20. The incinerator which in Figs. 4 and 5 is shown generally at 21 may connect with the tunnel of the kiln by a by-pass or outlet 22 leading to the upper and lower chambers 1 and 2 of said incinerator for the entry of the waste heat or the by-passing of a portion of the heat from the tunnel into the chambers 1 and 2 in the same manner as that shown in Fig. 1. Dampers 23 and 24 control the admission of heat to the chambers 1 and 2. Dampers corresponding to the dampers 12 and 16 control the outlet ends of the chambers 1 and 2. One of said dampers is shown at 25 in Fig. 4. The construction and operation of the incinerator shown in Figs. 4 and 5 is in all respects similar to that of the incinerator previously described, the only difference being that the waste heat is derived from a kiln instead of a steam boiler.

Having thus described my invention, what I claim as new and desire to secure by Letters Patent is:—

1. In a sanitary incinerator for the utilization of products of combustion derived from a source extraneous thereto, an incinerating chamber adapted to receive the material which is to be incinerated, a separate chamber for directly receiving the products of combustion, a wall between said chambers through which heat derived from the products of combustion may pass from the heating chamber to the incinerating chamber, each of said chambers having an inlet and an outlet, said inlets being arranged to receive, when open, the extraneous products of combustion, means for normally closing the inlet to the incinerating chamber so that it will be sealed against entry of said products of combustion, means for opening and closing at will the inlet and outlet of the heating chamber, said chambers being out of communication with each other, and a damper for the outlet of the incinerating chamber which has means causing it to remain normally partially open, so that there is a normal "bleed" or draft leakage through said outlet for the ventilation of said incinerating chamber.

2. A sanitary incinerator for the utilization of products of combustion derived from a source extraneous thereto, having an incinerating chamber adapted to receive the material which is to be incinerated, said chamber having an outlet, a damper for said outlet, suspending means for said damper which normally retains the damper in partially closed condition and prevents the complete closing thereof, thus permitting a normal "bleed" or draft leakage from said incinerating chamber for the ventilation thereof, said suspending means enabling the damper to be raised to wholly open the outlet of the chamber, a separate heating chamber for directly receiving the products of combustion, said separate heating chamber having an inlet and an outlet for the products of combustion, dampers for said inlet and outlet, and a wall between said chambers through which heat derived from the products of combustion may pass from the heating chamber to the incinerating chamber.

In testimony whereof I hereunto affix my signature.

JOHN B. OWENS.